United States Patent [19]

Rudolph et al.

[11] 4,095,992
[45] Jun. 20, 1978

[54] COATINGS CONTAINING STARCH ESTERS

[75] Inventors: Stephen Edward Rudolph, Glenwood; Raymond Charles Glowaky, Matteson, both of Ill.

[73] Assignee: The Sherwin-Williams Company, Cleveland, Ohio

[21] Appl. No.: 747,275

[22] Filed: Dec. 3, 1976

Related U.S. Application Data

[62] Division of Ser. No. 609,327, Sep. 2, 1975, Pat. No. 4,011,392.

[51] Int. Cl.$^2$ ............................................. C08L 3/06
[52] U.S. Cl. ................................. 106/213; 106/214; 260/17.3
[58] Field of Search ................ 106/210, 213, 214; 536/108, 110; 260/17.3

[56] References Cited

U.S. PATENT DOCUMENTS

| | | | |
|---|---|---|---|
| 3,281,411 | 10/1966 | Lemmerling | 536/110 |
| 3,379,720 | 4/1968 | Reid | 536/110 |
| 3,732,207 | 5/1973 | Kovats | 536/110 |
| 4,018,959 | 4/1977 | Demko et al. | 260/17.3 |

Primary Examiner—Lorenzo B. Hayes
Assistant Examiner—Amelia B. Yarbrough
Attorney, Agent, or Firm—James V. Tura; Neil A. DuChez

[57] ABSTRACT

This invention is directed to mixed esters of starch and to the method of preparing and the use of said starch esters which are derived from (a) low molecular weight hydrolyzed starch having a plurality of anhydroglucose units and (b) at least about 0.5 mole of acylating agent per anhydroglucose unit consisting of mono- and polycarboxylic acid anhydrides and acyl halides. These anionic esters of starch with average molecular weights ranging up to 100,000 are characterized as having a high degree of substitution, i.e. ranging up to 3.0 wherein at least about 0.1 of the total degree of substitution consist of ester groups having pendant carboxyl radicals derived from anhydrides of polycarboxylic acids.

5 Claims, No Drawings

COATINGS CONTAINING STARCH ESTERS

This is a division of application Ser. No. 609,327, filed Sept. 2, 1975, now U.S. Pat. No. 4,011,392.

This invention relates to mixed esters of starch, the method of preparing said starch esters and the various uses of the starch esters particularly in coating compositions. More specifically, the invention relates to mixed esters of starch having average molecular weights ranging up to about 100,000 and particularly characterized as anionic starch esters having a degree of substitution ranging from about 0.5 to 3.0. The mixed esters of starch are derived from (a) hydrolyzed starch having a plurality of anhydroglucose units and a dextrose equivalent value ranging up to 40 and (b) an acylating agent consisting of (i) the ahydrides of polycarboxylic acids and (ii) the anhydrides of monocarboxylic acids and/or the acyl halides of monocarboxylic acids.

BACKGROUND

An incentive for developing starch esters particularly useful in coating compositions is the continued uncertainty over the availability of raw materials derived from petrochemicals. The problem is compounded by the fact that the coating industry, for example, does not represent sufficient outlet for any of the basic petrochemicals to command a stable long-term supply. Moreover, many of the feedstocks for the petrochemical industry, e.g. gas, oil, coal, etc. may be diverted into energy applications particularly at times of high demand. One approach to the problems is to diversify the raw materials supply by relying on agricultural products which are renewed on an annual basis and, if needed, can be expanded to meet the demands by increasing the acreage of crops, e.g. corn, potatoes, etc.

For example, starch is presently being produced at rates exceeding 10 billion pounds per year and is being used for many industrial applications and because of the chemical similarity between starch and cellulose, the latter which has been used in coatings, it is surprising that starch and its derivatives have not received more attention as a potential raw material particularly for the coating industry. It is known that starch in its various natural forms is both water sensitive and brittle and, therefore, must be chemically modified before obtaining the properties necessary for coatings. The highly modified starches, e.g. the type needed in coatings are not commercially available. However, a number of chemically-modified starches, i.e. high molecular weight with low D. S. values showing some promise include the starch esters, starch ethers, starch urea-formaldehyde resins, starch copolymers, etc.

Standard grades of the high molecular weight starches comprise approximately 80% amylopectin having average molecular weights ranging from 1 to 30 million and about 20% of amylose having average molecular weights ranging from about 40,000 to 300,000. The structure of amylopectin and amylose may be illustrated by formulas I and II, wherein $n$ designates the number of linear and branched anhydroglucose repeat units.

FORMULA I
AMYLOSE

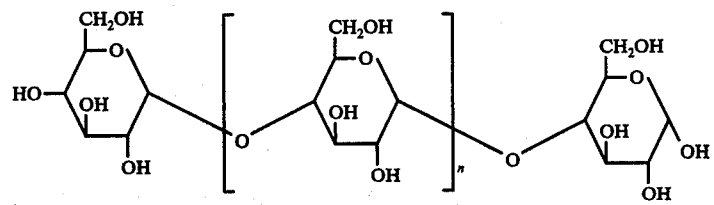

FORMULA II
AMYLOPECTIN

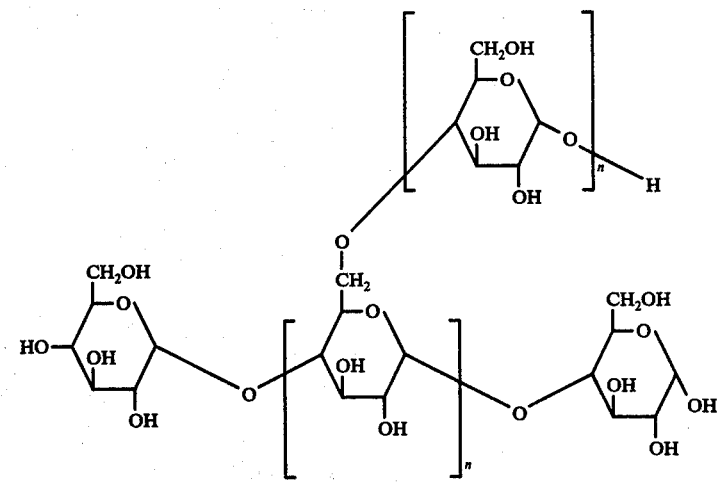

SUMMARY

In contrast to the high molecular weight starches, i.e. comprising high molecular weight polymeric chains of amylose and amylopectin, the hydrolyzed starches, i.e. low molecular weight or depolymerized chains of amylose and amylopectin in accordance with this invention have average molecular weights ranging up to only about 100,000. Many of the starches suitable for this invention are commercially available materials. Others may be prepared using known hydrolysis techniques. Examples of typical materials are included in the table below. Average molecular weights of these materials were determined by gel permeation chromatography with polydextran standards and filtered deionized water as carrier solvent. In addition to those specifically shown below, there are numerous other similar starches and derivatives thereof that come within the scope of this invention.

TABLE

| Materials | Type | D.E. | Supplier | Approx. Average Molecular Weight |
| --- | --- | --- | --- | --- |
| Fro-Dex 42 | Dried corn syrup | 42 | American Maize-Products Co. | 600 |
| Fro-Dex 15 | Maltodextrin | 18 | American Maize-Products Co. | 16,000 |
| Amaizo 1736 | Dextrin | 4 | American Maize-Products Co. | 16,000 |
| Mor-Rex 1918 | Cereal Solids | 10 | CPC International | 18,000 |
| Experimental Sample | Low D.E. Hydrolysate | 5 | American Maize-Products Co. | 35,000 |
| RL 5540 | Enzyme Hydrolysate | 0 | SW Laboratories | 86,000 |

Because of the average low molecular weights, these hydrolyzed starches may be characterized as comprising branched and linear anhydroglucose units, but preferably consisting essentially of the linear or straight polymeric chains since many of the branch points were cleaved in the hydrolysis process. The advantages in using the low molecular weight starches, i.e. the hydrolyzed starches for esterification are numerous and include the ability to control the solubility characteristics which provides means for preparing highly concentrated solutions of workable viscosity useful for coatings.

While much attention has been given to the high molecular weight starches and various derivatives thereof, comparatively little has been done with the low molecular weight starches, especially the lower molecular weight starches with a high degree of substitution. Moreover, neither the high or the low molecular weight modified starches have been considered for use as protective coatings. This is primarily because films derived from the high molecular weight starch esters are brittle due to the branched portions of the polymer, i.e. amylopectin. In the lower molecular weight hydrolyzed starches, the problem is minimized and therefore coatings can be prepared.

Thus, it has been found in accordance with this invention that low molecular weight starches may be used as polymeric binders particularly in coatings after chemical modification, i.e. esterification to render the starch less sensitive to water and less brittle. These starches can be modified by esterification to give polymeric derivatives capable of being used in water-based coatings and particularly for thermosetting coatings. The final properties of the hydrolyzed starch can be controlled largely by the extent and type of esterification. For example, starch is substantially a polymer of glucose having three hydroxyl groups per repeating unit (see the structure of amylose and amylopectin) and by converting all of the hydroxyl groups per unit to ester linkages, the esterified starch is then characterized as having a degree of substitution or D. S. value of 3.0. This degree of substitution is the maximum possible D. S., but other ester derivatives may be made at various levels ranging for example, from 0.0001 to 3.0. For purposes of this invention, however, the degree of substitution is essential and must fall within the range of 0.5 to 3.0. This characterizes the number of ester groups per anhydroglucose unit.

Accordingly, it is an object of this invention to provide comparatively low molecular weight mixed starch esters, derived from low molecular weight hydrolyzed starches and acylating agents consisting of anhydrides of polycarboxylic acids and anhydrides of monocarboxylic acids and the acyl halides of monocarboxylic acids. It is another object of this invention to provide esterified starch with a high degree of substitution particularly useful for preparing coating compositions. It is another object of this invention to provide relatively low molecular weight, anionic mixed starch esters having high D. S. value and containing carboxyl groups. It is another object of this invention to provide anionic mixed starch esters useful for a variety of purposes, e.g. as coatings, dispersants, controlled permeability films and the like derived from acylating agent consisting of the anhydrides of monocarboxylic acids and polycarboxylic acids. These and other objects of the invention will become apparent from a further and more detailed description of the invention as follows.

DETAILED DESCRIPTION

More specifically, this invention is directed to the preparation of novel esters of starch and particularly anionic mixed esters of starch characterized as having average molecular weights ranging up to about 100,000 and an average degree of substitution or D. S. value ranging from about 0.5 to 3.0 wherein at least about 0.1 of the total degree of substitution consists of half-ester groups, i.e. ester linkages having pendant carboxyl groups, or acid radicals derived from the anhydrides of polycarboxylic acids. These mixed esters of starch are prepared from (a) low molecular weight hydrolyzed starch and the various derivatives thereof, e.g. starch ethers, or esters with D. S. values ranging only up to about 0.1 characterized as having a plurality of anhydroglucose units and average molecular weights ranging up to about 100,000, and (b) at least about 0.5 mole of acylating agent for each anhydroglucose unit of the hydrolyzed starch and/or a derivative thereof.

The acrylating agent for purposes of this invention consists of (i) from about 0.1 to 2.9 moles of at least one anhydride of a polycarboxylic acid and preferably an anhydride of a dicarboxylic acid having at least 3 carbon atoms per molecule and (ii) from about 0.1 to 2.9 moles of at least one anhydride of a monocarboxylic acid and/or an acyl halide of a monocarboxylic acid, e.g. the acyl chloride of acetic acid, benzoic acid, etc.

Preferably, the anionic mixed esters of starch of this invention are characterized as having average molecular weights below 100,000, e.g. ranging up to about 80,000 or lower, and as having on an average a degree of substitution of at least about 0.5 but preferably greater than 1.0, i.e. from about 1.0 to 3.0 wherein at least about 0.1, i.e. from about 0.1 to 2.9 of the total degree of substitution consists of ester groups having pendant carboxyl groups derived from at least one anhydride of a dicarboxylic acid. The hydrolyzed starch (depolymerized starches) are reacted with at least about 0.5 mole of acylating agent and upwards to about 3.0 moles of acylating agent for each anhydroglucose unit. Preferably, the acylating agent consists of the ratio of (i) from about 0.3 to 2.3 moles of at least one anhydride of a polycarboxylic acid, such as the anhydride of a dicarboxylic acid and (ii) from about 0.7 to 2.7 moles of at least one anhydride of a monocarboxylic acid, such as acetic anhydride and/or the acyl halide of a monocarboxylic acid.

The anionic mixed esters of starch in accordance with this invention are prepared by reacting the low molecular weight hydrolyzed starch with the acylating agent in a liquid medium free of water which contains at least one organic solvent, e.g. pyridine at temperatures ranging up to about 150° C, e.g. from about room temperature to 115° C or from about 25° C to 85° C.

In one aspect of this invention, the esterification of the hydrolyzed starch is to improve the film-forming characteristics and solubility properties of the starch polymer for coating purposes. Of particular interest is the water solubility since unmodified starches are highly hydrophilic and, therefore, too water sensitive to be used in coatings. Thus, depending on the degree of esterification, the hydroxyl groups (three hydroxyl groups per anhydroglucose unit) can be replaced with organic groups to render the starch more hydrophobic. However, there is a critical degree of substitution for purposes of this invention and can be defined as the number of hydroxyl groups replaced per anhydroglucose repeat unit which is a minimum of 0.5 and a maximum of 3.0. In comparison to the esterified starches known heretofore, the low molecular weight starches of this invention are regarded as having a high degree of substitution in starch technology. In general, the low degree of substitution materials are more common, e.g. D. S. values of 0.002 to 0.05, but these are not materially different from the unmodified starches particularly for coating purposes.

Thus, the degree of substitution is a critical factor in determining the starch esters characteristics and performance particularly in coatings. In general, the hydrophobicity of the starch polymer increase substantially as the degree of substitution increases. This may be illustrated by the solubility properties of the starch polymer which changes from water-soluble, organic-insoluble at low degrees of substitution to water-insoluble, organic-soluble at high degrees of substitution. Accordingly, the degree of substitution of a particular starch ester is dictated by testing the material as a binder in an aqueous thermosetting coating. For example, esters prepared with the appropriate degree of substitution provide starch esters that are soluble in a typical aqueous coating, e.g. solvent blends of about 80% water and 20% cosolvent such as alcohol, Cellosolve, etc.

The basic material, i.e. starch, utilized in preparing the mixed starch esters may be derived from any vegetable source such as corn, wheat, tapioca, rice, potato, grain, etc. These starches may be predominantly or exclusively amylose or amylopectin or may consist of mixtures of these two types of molecules in any proportion. These starches may be converted into a useful form for purposes of this invention by various processes that reduce or lower the average molecular weight of the starch, e.g. exposure to acid, enzymes, heat, etc. under varying conditions of concentration, solvent, temperature, pressure, etc. Also included for purposes of this invention are starches that have been derivitized by known methods, before or after hydrolysis, such as the ethers, carbamates, esters, oxidized starches, etc. These starch derivatives are useful, of course, only if they have not been so highly substituted with the various groups that the required D. S. i.e. minimum acylation of 0.5, in accordance with this invention can be obtained. Preferred materials are the hydrolyzed starches and the low substituted derivatives thereof, e.g. starch derivatives with various substituents such as ethers or esters with D. S. of less than 0.1, which have dextrose equivalent values ranging up to about 40 or in the range of 0 to 30 as measured by the Luc-Schoorl Method.

These hydrolysates may consist of either linear or branched chains. Alternatively, the starches may have a distribution of species ranging from linear i.e. straight chains or prevailing linear to the highly rearranged or branched chains. Examples of such materials include the enzyme modified starches, acid hydrolysates, low D. E. hydrolysates, dextrins, derivitized or modified hydrolysates and other low molecular weight starches such as those commercially available as cereal solids, maltodextrins, dried syrups, thin-boiling starches, amylose fractions, etc. Any one or all of the above-mentioned low molecular weight starches including the various derivatives thereof, e.g. ether derivatives may be used for purposes of this invention. All of these starches and/or the derivatives thereof are referred to herein and are intended to be included in the term "low molecular weight hydrolyzed starch."

The anionic mixed esters of starch described by this invention include substituents of both the simple alkyl and/or aryl ester groups and the alkyl and/or aryl half-ester groups, illustrated by the mixed starch esters of the following Formulae:

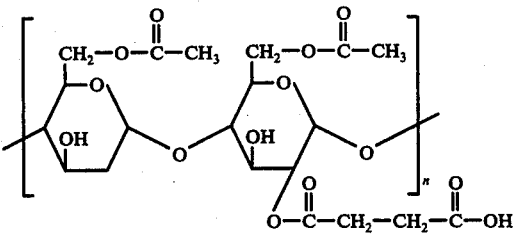

III. Starch Acetate-Succinate, D. S. = 1.0/0.5

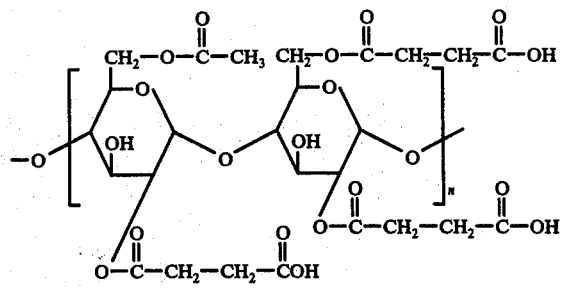

III A. Starch Acetate-Succinate, D. S. = 0.5/1.5

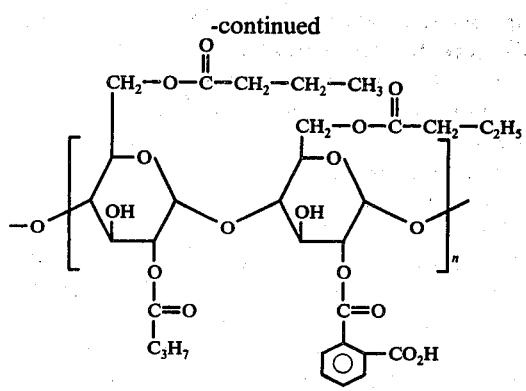

III B. Starch Butyrate-Phthalate, D. S. = 1.5/0.5

These carboxyl-containing aliphatic, cyclic, heterocyclic and/or aromatic mixed esters, i.e. anionic mixed esters of starch as distinguished from the various other esters of starch have characteristics which make them unique particularly from the simple esters, e.g. esters derived from the anhydrides of monocarboxylic acids. More specifically, the pendant carboxyl groups or radicals of the starch esters are reactive sites for subsequent crosslinking with various crosslinking agents such as the amino compounds which are typically used in preparing thermosetting coatings. Moreover, the carboxyl or acid groups are available also for further derivitization, if needed, for the formation of inorganic or organic salts, amides, esters, urethanes, etc. For example, the pendant carboxyl groups may be completely or partially reacted or neutralized with inorganic metal compounds including the alkali and alkaline earth metal compounds such as sodium hydroxide etc. or ammonium hydroxide and the various amines by known methods.

While processes for the esterification of starch have been studied and a number of reaction procedures have been reported, most of these procedures are unsatisfactory for the instant invention in that they involve direct esterification in the presence of water or with acids. For purposes of this invention, there are some practical constraints which limit the number of techniques that may be used in the esterification. For example, the starch esters of this invention are materials with a high degree of substitution, which requires the reaction to be carried to substantially stoichiometric completion. Thus, esterification techniques generally used in preparing products having a low degree of substitution through formation of a small equilibrium concentration of esters are not applicable.

More specifically, many of the procedures involving aqueous media cannot be used since the presence of water or water-forming reactants shifts the reaction equilibrium predominantly toward the starting materials. Moreover, the thermostability of starch is such that decomposition begins at comparatively low temperatures which generally means comparatively mild thermo conditions should be employed and, therefore, reactants of low reactivity requiring elevated temperatures should not be used. In addition, the solubility and the properties of starch are such that they impose a restriction on the choice of the esterification procedure in that, for example, starch is soluble in water, pyridine, formamide and the like, but is substantially insoluble in most organic solvents such as the ketones, hydrocarbons, etc. Thus, since it is highly desirable to have a homogeneous process to provide good control of the reaction and because a product with a reproducible degree of substitution is needed, it is essential that the reaction medium contain a comparatively good solvent for the starch or at least a solvent for the esterified products formed.

More specifically, esterification of the hydrolyzed starch preferably takes place in a reaction medium free from water or which is substantially free from water and contains at least one solvent such as pyridine, formamide, the alkyl formamides such as dimethyl formamide, diethyl formamide, etc. the sulfoxides such as dimethyl sulfoxide, etc. A unique feature in utilizing pyridine as distinguished from other solvents is that pyridine acts as a promotor probably through the formation of an intermediate which subsequently undergoes nucleophilic substitution by the starch hydroxyl for acylation.

Esterification of the comparatively low molecular weight starches occurs readily and goes to a high percent of conversion. In some instances, however, an interfering factor is the presence in the hydrolyzed starch of a small amount of moisture, e.g. from about 2 to 3% water. This water reacts with the anhydride to hydrolyze it to the corresponding acid which is very slow in reacting with starch, if at all, under these conditions. For this reason, it is generally a practice to add sufficient amount of anhydride beyond the stoichiometric requirements, e.g. upwards of 10 or 20% or more in excess of the stoichiometric requirements in order to consume the small amount of water that may be present in the starch.

In the preparation of the mixed starch esters in accordance with this invention and particularly where aliphatic acylating agents are employed, it is advantageous to add the longer chain anhydride first since it is less reactive and requires a longer reaction time and allows the lesser reactive anhydride to react with the more reactive hydroxyl groups of the starch. However, a portion of the shorter chain anhydride, e.g. acetic anhydride may be added either before or together with the long chain anhydride which helps to consume the small amount of residual water in the starch. The carboxyl-containing mixed aliphatic esters of starch which have a high D. S. value are of particular interest and can be derived from aliphatic and cyclic anhydrides, e.g. acetic and succinic anhydrides preferably in a reaction medium containing pyridine as illustrated in Example A.

EXAMPLE A

| Reactants | Parts by Weight | Moles |
|---|---|---|
| Hydrolyzed Cereal Solids | 200 Total of 194.8 Starch & 5.2 Water | 1.20 0.29 |
| Acetic Anhydride | 262.2 | 2.57 |
| Succinic Anhydride | 77.7 | 0.78 |
| Pyridine | 200.0 | |
| Starch Acetate-Succinate D. S. = 1.9/0.6 | | |

In the above example, the hydrolyzed starch was added to the reaction medium comprising pyridine and the resulting suspension was heated with stirring to temperatures ranging up to about 82° C until a clear solution was formed in approximately 30 minutes. The acetic anhydride was added over a period of about one hour while holding the temperature at about 82° C. The reaction mixture was held at about 82° C for an hour to insure completion of the reaction and subsequently the succinic anhydride was added in small portions over approximately 30 minutes. The reaction mixture was again held at about 82° C for a period of about 4 hours to assure completion of the reaction. This procedure yields a homogeneous solution of starch esters in pyridine from which the esters may be separated by precipitating the pyridine solutions into a non-solvent, e.g. a precipitating system comprising butanol and a hydrocarbon such as hexane, etc. Conversion of the hydrolyzed starch to the corresponding starch esters is substantially quantitative in that there are no major side reactions except for some losses due to impurities, loss of product during isolation, filtration, drying, handling, etc. Typical yields of the starch esters are illustrated in the data in Table I.

TABLE I

| Ester of Starch | Calculated Degree of Substitution | Yield, % |
|---|---|---|
| Acetate-Succinate | 1.0/0.5 | 81 |
| Acetate-Succinate | 2.0/0.5 | 82 |

The mixed esters of starch in accordance with this invention contain both non-functional aliphatic and/or aromatic side groups and carboxyl-containing aliphatic and/or aromatic side groups, e.g. starch acetate-succinate or propionate-succinate, etc. as illustrated by Formula IV, wherein the D. S. value of each acylating agent is 1.0 for a total degree of substitution of 2.0.

FORMULA IV

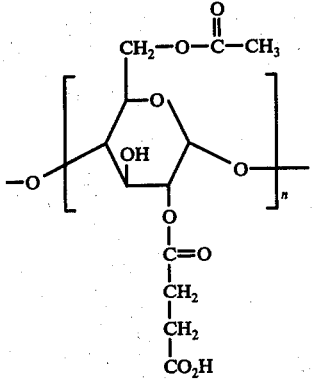

The presence of carboxyl groups in these mixed esters provide increased functionality, altered solubility and the ability to dissolve the ester in aqueous systems through neutralization. It has been found that these particular starch esters are very useful in preparing coatings. e.g. thermosetting coating. These coatings do not need a cosolvent and are solubilized by reacting the carboxyl groups of the starch esters with various solubilizing reagents including, for example, ammonia, organic amines, inorganic metals and combinations thereof. Because the solubility occurs through ionic forces, the esters are inherently hydrophobic in character but may be used in aqueous mediums as coatings provided there are sufficient carboxyl functional groups to obtain the desired solubility. The carboxyl groups introduced by acylation into the starch polymer can be used as crosslinking sites generally not possible with hydroxyl groups. For example, a difunctional epoxide may be used as the crosslinking agent for a starch ester containing sufficient amounts of pendant carboxyl functionalities. These carboxyl-containing mixed starch esters are substantially different in terms of solubility, etc. in comparison to the simple esters and the presence of the carboxyl groups also result in better solubility in a wide range of organic solvents. As indicated, these carboxyl-containing starch esters which contain even a small amount of carboxyl functionality generally will be soluble or at least can be made soluble in water when neutralized. Thus, a cosolventless aqueous coating can be prepared from the mixed starch esters containing a minimum amount of free carboxyl groups or a derivative thereof, e.g. where the free carboxyl groups are reacted with amines, ammonia, metals, etc. Table II illustrates the range of carboxyl-containing starch esters that can be prepared in accordance with this invention.

TABLE II

| Carboxyl Aliphatic Esters of Starch | |
|---|---|
| Ester | Calculated D. S. |
| Acetate-Succinate | 0.5/1.5 |
| Acetate-Succinate | 0.5/2.0 |
| Acetate-Succinate | 0.5/2.5 |
| Acetate-Succinate | 1.0/1.5 |
| Acetate-Succinate | 1.0/2.0 |
| Acetate-Succinate | 1.3/0.52 |
| Acetate-Succinate | 1.5/0.25 |
| Acetate-Succinate | 1.5/0.50 |
| Acetate-Succinate | 1.5/1.00 |
| Acetate-Succinate | 1.5/1.50 |
| Acetate-Succinate | 1.57/0.56 |
| Acetate-Succinate | 1.7/0.4 |
| Acetate-Succinate | 1.0/0.65 |
| Acetate-Succinate | 2.0/0.25 |
| Acetate-Succinate | 2.0/0.50 |
| Acetate-Succinate | 2.0/1.00 |
| Acetate-Succinate | 2.32/0.51 |
| Propionate-Succinate | 2.32/0.51 |
| Butyrate-Succinate | 2.32/0.51 |

The data in Table II illustrates the preparation of a wide range of carboxyl-containing aliphatic starch esters ranging from a low aliphatic to a high carboxyl content to a high aliphatic to a low carboxyl content.

As indicated, the mixed esters of starch contain small but effective amounts of carboxyl groups, e.g. free carboxylic acid groups or derivatives thereof. For example, if only 0.5 of the 3.0 hydroxyl groups present in each of the anhydroglucose repeat units of the starch is substituted with an acyl group, i.e. the residue of a carboxylic acid anhydride, it is important that at least about 0.1 and preferably 0.3 of that substitution i.e. at least 0.1 of 0.5 be derived from a polycarboxylic acid anhydride. Thus, the mixed esters of starch are characterized as having a degree of substitution of at least 0.5 and preferably 1.0 wherein at least about 0.1 of the total degree of substitution is derived from anhydrides of polycarboxylic acids, e.g. dicarboxylic acid anhydrides.

The modification or esterification of the glucose repeat units proceeds in a random or statistical manner wherein each glucose unit is available for reaction with the acylating agent. The degree of substitution can be readily determined by the nuclear magnetic resonance spectra (NMR) of the starch esters not only to identify the structure, but also to determine the degree of substitution. For example, in an acetate ester the methyl group next to the carbonyl appears as a well defined singlet in the spectrum. It is possible also to quantitatively determine the degree of substitution of the starch esters by hydrolysis of the ester groups. Other methods of determining the structure of starch esters includes the determination of the hydroxyl content, the acid values and the use of infra-red data.

The hydrolyzed starches (depolymerized starch) designated herein, have a comparatively low molecular weight which form clear aqueous solutions with a solids content ranging up to about 50% by weight. Esterification of the starch molecules render the polymer particularly useful as a binder for coatings. Through select esterification, the solubility characteristics of the starch molecules can be completely altered. For example, the preparation of an acetate ester of cereal solids with a D. S. value of 2.8 renders the water soluble starting material completely water insoluble, but soluble in organic solvents such as chloroform, acetone, etc. Thus, at some intermediate degree of substitution (esterification), an exact control of the starches solubility in water and/or cosolvents can be obtained. With the increasing content of the ester groups, there is a decrease in water solubility and, therefore, the hydrophilic character of the esters decrease as the esterification of the starch molecules increases. Moreover, as the chain length of the ester groups increase, e.g. from acetate to butyrate, etc. the hydrophobic character of the molecule increases and the D. S. value needed for solubility in a particular solvent is lowered. Specifically, an acetate ester with a D. S. value of 1.8 has a solubility similar in character to that of the butyrate with a D. S. value of 0.5. Thus, the esterified starch molecules of this invention can be specifically designed for use in water and/or solvent-containing coatings. These coating systems are conventional in that they can be applied by methods used heretofore and require no special application equipment but rather can be applied by spraying, dipping, brushing, roller coating, powder coating, etc.

Although a particular mixed starch ester may be substantially insoluble in water, it can be made water soluble, e.g. neutralization of the pendant carboxyl groups by the introduction of ionic groups into the molecule which are inherently water soluble and therefore can be easily solubilized as illustrated by the following formula:

FORMULA V

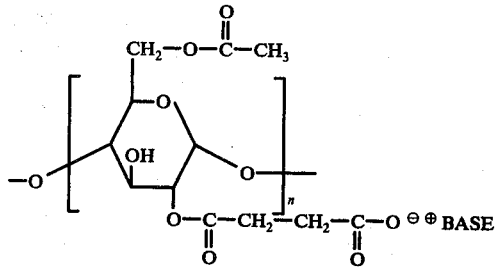

When coatings, e.g. aqueous paints are prepared from the mixed starch esters, e.g. starch acetate-succinate or other carboxyl-containing starch esters are sprayed onto a substrate, it is possible to obtain a cured film with a high gloss and good surface appearance. The coating compositions are thermally cured by using various crosslinking agents and particularly the epoxy or amino compounds which are reactive with the hydroxyl and-/or carboxyl functionalities on the starch esters.

A number of coatings were prepared from various D. S. carboxyl-containing starch esters as illustrated in Table III.

TABLE III
Properties of Pigmented Starch Acetate-Succinate Coatings

| Acetate | Succinate | H₂O/Butyl Cellosolve | Pencil Hardness | MEK 100 Rubs | Surface Appearance | Water Immersion |
|---|---|---|---|---|---|---|
| 1.0 | 0.25 | 80/20 | 7H | Excellent | Bubbles | 24 hr. — Blisters |
| 2.0 | 0.25 | 65/35 | 8H | Excellent | Bubbles | 24 hr. — Sl. blisters |
| 1.6 | 0.59 | 80/20 | 8H | Excellent | Good | 72 hr. — Sl. blisters |
| 1.9 | 0.65 | 80/20 | 5H | Excellent | Excellent | 24 hr. — Blisters |
| 1.5 | 1.00 | 80/20 | 8H | Excellent | Good | 24 hr. — Poor |

Vehicle: 70% Starch Acetate-Succinate 30% Resimene 730
20% PVC (pigment volume concentrate)
Bake 30 min. at 300° F.

The data suggests that at these levels, i.e. above about D. S. of 1.0 the degree of substitution with different anhydrides is not critical to a satisfactory result. It was found, however, that a minimum succinate content of above D. S. 0.25 helped to eliminate foaming in the aqueous systems. On the other hand, a very high succinate content has some affect on water resistance and that the solubility in an 80/20 solvent blend was achieved with a fairly wide range of carboxyl-containing starch esters.

The data in Table IV illustrates coating compositions containing mixed esters derived from low molecular weight hydrolyzed starch (depolymerized starch) and the anhydrides of acetic and succinic acids. These compositions are completely dispersible in water with amines, e.g. dimethylethanol amine as the neutralizing agent at pH of 6.5 to 8.0. In dispersing the propionate and butyrate succinate mixed esters, a cosolvent such as butyl Cellosolve was used, which indicates the increasing hydrophobic character of the higher molecular weight mixed esters.

TABLE IV
Formulation of Clear, Water-Based Coatings of Starch Alkyl-Succinate Esters

| | Composition, Wt. % | | |
|---|---|---|---|
| | Acetate (2.3) Succinate (0.5) | Propionate (2.3) Succinate (0.5) | Butyrate (2.3) Succinate (0.5) |
| Starch Ester D.S. = 2.8 | 33.3 | 33.3 | 30.4 |
| Water | 50.0 | 43.3 | 39.3 |
| Butyl Cellosolve | — | 6.7 | 15.1 |
| Dimethylethanolamine | 6.7 | 6.7 | 6.1 |
| Resimene 730 | 10.0 | 10.0 | 9.1 |
| | 100.0 | 100.0 | 100.0 |

TABLE V
Evaluation of Clear, Water-Based Coatings of Starch Alkyl-Succinate Esters in Table IV

| Performance Test | Acetate-Succinate | Propionate-Succinate | Butyrate-Succinate |
|---|---|---|---|
| Appearance | Discolored | Clear, glossy | Clear, particles |
| Adhesion | Good | Excellent | Excellent |
| Pencil Hardness | 7H | 7H | 7H |
| Bend - 90° | Cracks | OK | OK |
| Impact 10 in-lbs./reverse | Fail | Fail | Fail |
| 20 in-lbs./forward | Pass | Pass | Pass |
| Water Immersion (7 Days) | Blisters, cracking | Few blisters on edges | No effect |
| Humidity Cabinet | Fails-24 hrs. | No effect- 250 hrs. | No effect- 250 hrs. |
| Salt Spray, 5% | 24 hrs.-Complete failure | 24 hrs. - OK 48 hrs. - | 24 hrs. - OK 48 hrs. - |

TABLE V-continued
Evaluation of Clear, Water-Based Coatings of Starch Alkyl-Succinate Esters in Table IV

| Performance Test | Acetate-Succinate | Propionate-Succinate | Butyrate-Succinate |
|---|---|---|---|
| | | Blisters, rusting | Few blisters | a.Bonderite 1000 substrate, bake 30 minutes at 300° F.

The data in Table V illustrated that the clear films derived from the coating compositions exemplified in Table IV are hard films.

A typical pigmented coating composition is illustrated in Table VI wherein it was found that the mixed ester had hydrophobic characteristics with improved water resistance in the salt spray and humidity test.

TABLE VI
Starch Ester Pigmented Coating Formulation

| Component | Wt. Percent |
|---|---|
| Starch Propionate-Succinate[1] | 21.0 |
| Cymel 303 | 9.0 |
| TiO$_2$ | 22.6 |
| Water | 42.9 |
| Dimethylethanolamine | 1.5 |
| Butyl Cellosolve | 3.0 |

Vehicle = 70% Starch Ester
  30% Cymel 303
  (Methoxymethyl Melamine)
Solvent = 93.5% Water
  6.5% Cellosolve
20.15% Pigment Volume Concentration
52.55% Non-Volatile Material
36.54% Non-Volatile Vehicle

[1] D.S. = 2.3/0.5

For purposes of this invention, the acylating agent consists of at least one anhydride of a polycarboxylic acid, e.g. one or more polycarboxylic acid anhydrides and at least one acylating agent consisting of an anhydride of a monocarboxylic acid, e.g. acetic anhydride and/or an acyl halide such as the acid chloride of a monocarboxylic acid. The ratio of acylating agents, i.e. the polycarboxylic acid anhydrides to monocarboxylic acid anhydrides and/or acyl halides range from 0.1 to 2.9 moles and preferably from 0.3 to 2.3 mole of the polycarboxylic acid anhydrides to 0.1 to 2.9 moles and preferably 0.7 to 2.7 moles of the monocarboxylic acid anhydride and/or acyl halides of said monocarboxylic acids. The acylating agent, i.e. the anhydrides may be added either independently in a sequential manner or as a combination with one or more anhydride to obtain the mixed esters of starch. The reaction between the anhydrides and the hydrolyzed starch is substantially stoichiometric but to achieve the required degree of substitution an excess amount of anhydride, e.g. ranging up to about 20% and more likely 10% excess may be used in the required relative proportions. The reaction of the acylating agent with the hydrolyzed starch takes place in a medium substantially free of water and preferably containing at least one organic liquid which is a solvent, either for the monomers and/or the reaction product. These solvents preferably include pyridine, the sulfoxides, the dialkyl formamides, e.g. dimethyl formamide, diethyl formamide, etc.

As indicated, the hydrolyzed starches are reacted with the acylating agent, at ratios of about 0.5 to 3.0 moles of the anhydrides for each anhydroglucose repeat unit of the hydrolyzed starch. The acylating agent, for purposes of this invention, includes (i) the anhydrides of at least one polycarboxylic acid and (ii) the anhydrides of at least one monocarboxylic acid and/or the acyl halide. These anhydrides may have up to 36 carbon atoms and include the saturated or unsaturated aliphatic, cycloaliphatic, heterocyclic e.g. isatoic anhydride and/or aromatic mono- and dianhydrides. The acylating agent must contain at least one

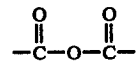

group or only one acyl halide group of a monocarboxylic acid, i.e. only one

group wherein X is a halogen, e.g. chlorine, bromine, etc. More specifically, the anhydrides of the monocarboxylic acids may be characterized by the formula:

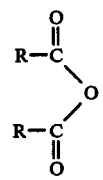

wherein R is a monovalent organic radical or substituted organic radical saturated or unsaturated selected from the class consisting of alkyl, aryl, alkaryl, aralkyl, cycloalkyl and heterocyclic radicals, e.g. radicals having up to 18 carbon atoms such as the lower aliphatic monocarboxylic acid anhydrides having 2 to 8 carbon atoms. These organic radicals may have one or more substituents selected from the class consisting of nitro, amino, carboalkoxy e.g. carbomethoxy, lower alkoxy, e.g. methoxy, phenoxy and various other substituents which do not interfer with the acylation or esterification reaction.

Specific anhydrides of the monocarboxylic acids include the saturated anhydrides such as acetic anhydride, propionic anhydride, butyric anhydride, etc. The unsaturated anhydrides such as acrylic anhydride, the substituted acrylic anhydrides, crotonic anhydride, oleic anhydride, etc. The aromatic monocarboxylic acid anhydrides, such as phenylacetic acid anhydride and various other anhydrides of monocarboxylic acids, e.g. caproic anhydride, caproylic anhydride, palmitic anhydride, phenoxyacetic anhydride, lauric anhydride, heptylic anhydride, stearic anhydride, myristic anhydride, benzoic anhydride, substituted benzoic such as sulfobenzoic anhydride, valeric anhydride, benzoylacetic anhydride, etc. As indicated above, the acyl halides, e.g. chlorides of the carboxylic acids may be used, but must be limited to the monohalides such as benzoyl chloride, benzoyl bromide and various substituted benzoyl halides such as nitrobenzyl chloride and the acetyl halides such as acetyl chloride, acetyl bromide, acetyl iodide, etc. Other acyl halides include myristyl chloride, phenylacetyl chloride, propionyl chloride, butyryl chloride, capryl chloride, naphthyl chloride, oleoyl chloride, linoleoyl chloride, etc.

The anhydrides of the polycarboxylic acids include the aliphatic, aromatic, cycloaliphatic and heterocyclic anhydrides and specifically the ethylenically unsaturated polycarboxylic acid anhydrides such as maleic anhydride, fumaric anhydride, citraconic anhydride, itaconic anhydride, etc. Other anhydrides include the anhydrides of dicarboxylic acids such as succinic anhydride, the substituted succinic anhydrides such as octeneylsuccinic anhydride, dodecyl succinic anhydride, etc. adipic anhydride, suberic anhydride, glutaric anhydride and the various aromatic carboxylic acid anhydrides such as phthalic anhydride, isophthalic anhydride, terephthalic anhydride, tetrahydrophthalic anhydride, naphthenic anhydride, etc. Also included are the cycloaliphatic anhydrides such as 3-cyclohexene-1,2-dicarboxylic acid anhydride and particularly the cyclic carboxylic acid anhydrides wherein the anhydride group forms part of the ring, i.e. where the two carboxyl groups are adjacent to one another in the molecule or sufficiently close to enable an internal rearrangement of the two carboxyl groups to form the anhydride group. Still other anhydrides of polycarboxylic acids include mellitic anhydride, trimellitic anhydrides, and combinations thereof.

The dianhydrides of tetracarboxylic acids include pyromellitic dianhydride, benzophenone tetracarboxylic dianhydride; diphenyl tetracarboxylic dianhydride; 2,2-bis (3,4-dicarboxyphenyl) propane dianhydride; bis(3,4-dicarboxyphenyl) ether dianhydride; bis(3,4-dicarboxyphenyl) sulfone dianhydride; bis(2,3-dicarboxyphenyl) methane dianhydride; naphthalene tetracarboxylic dianhydride; benzene-1,2,3,4-tetracarboxylic dianhydride, etc.

The carboxylic acid anhydrides may be obtained by dehydrating the corresponding acid by heating to temperatures above 70° C preferably in the presence of the dehydrating agent, e.g. acetic anhydride. Generally, the cyclic anhydrides are obtained from polycarboxylic acids having acid radicals separated by no more than three carbon atoms and preferably on adjacent carbon atoms such as succinic anhydride, whereas the linear anhydrides are obtained from polycarboxylic acids having acid radicals separated by four or more carbon atoms. The acid halides of the monocarboxylic acids are prepared by reacting the acid with a halogenating agent such as phosphorous tribromide, phosphorous pentachloride, etc.

The reaction of the acylating agent with the starch takes place in an organic medium substantially free of water and preferably containing at least one organic liquid capable of functioning as a solvent for the reactants or the resulting products. The preferred solvents include amines such as the aliphatic, aromatic or cyclic amines having up to 20 carbon atoms and various substituted aliphatic, aromatic or cyclic amines and particularly the tertiary amines. The preferred tertiary amines are the pyridines and quinolines such as benzyl pyridine, butyl pyridine, phenyl pyridine, propyl pyridine, methoxy pyridine, the trialkyl quinolines, e.g. trimethyl quinoline, phenyl quinoline, benzyl quinoline, methoxy quinoline, etc. In addition to pyridine, the homologs of pyridine may be used and include ethyl pyridine or picolines, e.g. dimethyl pyridine, ethyl pyridine, trimethyl pyridine, diethyl dimethyl pyridine, etc. In addition to the amines, other preferred organic liquids or solvents include the formamides, such as dimethyl formamide, diethyl formamide, the acetamides such as diethyl acetamide, dimethoxy acetamide, the sulfoxides such as dimethyl sulfoxide, etc. Other organic solvents or liquids include, for example, the dioxanes, the nitriles such as benzonitrile and various aromatic or cycloaliphatic solvents such as benzene, xylene, toluene, cyclohexane, the ketones such as methylethyl ketone, acetone, the acetates such as methyl acetate, the glycol ethers such as diethoxy ethane, the aliphatic solvents such as hexane, octane, pentane and various combinations of these organic liquids and solvents in any proportion.

The following examples illustrate the preparation of low molecular weight hydrolyzed mixed starch esters in accordance with this invention.

EXAMPLE B

Hydrolyzed Starch Butyrate-Phthalate D.S. = 1.8/0.5

Total D.S. = 2.3

Approximately 166 parts by weight of hydrolyzed starch of low molecular weight having a D. E. value of 10 and containing approximately 2.6% by weight of moisture was suspended in 175 parts by weight of pyridine and then dissolved by agitating at temperatures ranging up to about 150° F. Approximately 323 parts by weight of butyric anhydride were added at a rate to maintain the reaction temperature below about 190° F. Following the addition of the butyric anhydride, the reaction mixture was held at the same temperature for several hours. Approximately 74 parts by weight of phthalic anhydride were added as a solid over approximately 1 hour and the reaction mixture was maintained at a temperature below about 200° F for a period sufficient to allow the reaction of the anhydride to go to completion. After cooling, the product was isolated from the pyridine solution by precipitation into an excess of water with rapid agitation. The solid obtained was washed and dried to obtain a high yield of mixed starch ester as a pure white powder.

EXAMPLE C

Hydrolyzed Starch Acetate-Maleate D.S. = 1.0/1.0

Total D.S. = 2.0

Approximately 166 parts by weight of hydrolyzed starch having a D. E. value of 9-11 and containing approximately 2.6% by weight of moisture was slurried in 180 parts by weight of dimethyl formamide and dissolved with agitation while raising the temperature to about 150° F. Approximately 127 parts by weight of acetic anhydride were added while holding the temperature below 190° F. When the anhydride addition was completed, the reaction mixture was held at a maximum of about 200° F for several hours. Approximately 90 parts by weight of maleic anhydride were added as a solid over about 1 hour while holding the reaction temperature below about 200° F. The reaction mixture was then held at this temperature for several additional hours and then cooled. The product was isolated by precipitation of the reaction mixture into an excess of a nonsolvent, i.e. isobutanol.

EXAMPLE D

Hydrolyzed Starch Propionate-Succinate D.S. = 2.3/0.5

Total D.S. = 2.8

Approximately 250 parts by weight of a commercial hydrolyzed waxy maize starch having a dextrose equivalent or D. E. value of 5-6 and containing a low amount of ester substitution (less than D. S. = 0.1) was suspended in approximately 400 parts by weight of pyridine and then dissolved as recited in Example B. Propionic anhydride was added in amounts sufficient to obtain the desired degree of substitution and to consume any residual water in the starting material. Approximately 500 parts by weight of propionic anhydride was added over a 2 hour period while maintaining the temperature at about 180° F. After about 2 hours of mixing at 180° F, approximately 77 parts by weight of succinic anhydride was added over a 30 minute period as a solid. After approximately 2 hours of mixing at 180° F, the reaction mixture was cooled and the product was isolated by precipitation into a large excess of water. The product was washed and dried in a vacuum oven.

EXAMPLE E

Low Molecular Weight Dextrin-Acetate Hexahydrophthalate D.S. = 0.5/1.0

Total D.S. = 1.5

Approximately 162 parts by weight, on a dry basis, of a commercially highly converted yellow dextrin having a D. E. value of about 5 was suspended in pyridine and dissolved as recited in Example B in approximately 175 parts by weight of pyridine. Acetic anhydride was added to the mixture to consume the residual water in the system and then about 51 parts by weight of acetic anhydride was added over a 2 hour period at a temperature of about 180° F. Following a 2 hour hold at 180° F, approximately 152 parts by weight of hexahydrophthalic anhydride was added over several hours while maintaining the same temperature. The reaction mixture was stirred for an additional 2 hours below a temperature of 200° F and then cooled. The product was isolated as a solid by precipitation into an excess of water adjusted to a pH of 2–3. The solids were collected, washed and dried to yield a solid mixed starch ester.

EXAMPLE F

Hydrolyzed Starch Butyrate-Anthranilate D.S. = 0.8/2.0

Total D.S. = 2.8

Approximately 50 parts by weight of hydrolyzed starch having a D. E. value of 10 and containing about 2.6% by weight of moisture was suspended in about 200 parts by weight of dimethyl formamide and dissolved with stirring while the temperature was raised to about 160° F. About 50 parts by weight of butyric anhydride was added over a 30 minute period while maintaining the temperature at 180° F. The reaction mixture was held at this temperature for about 2.5 hours and a solution of about 90 parts containing 98 parts by weight of isatoic anhydride and 400 parts by weight of dimethyl formamide was added to the reaction mixture dropwise over 1.5 hours at temperatures of 180° F. The reaction mixture was held at this temperature for several hours and then cooled. A mixed starch ester product was isolated by precipitation into an excess amount of water. The product obtained was washed and then dried.

EXAMPLE G

Enzyme Hydrolyzed Starch Butyrate-Phthalate, D.S. = 1.3/0.5

Total D.S. = 1.8

Whole cornstarch (50 g.) was suspended in 500 g. of water and the pH adjusted to 6.5 to 7.5 using sodium carbonate solution. Bacterial α-amylose (AMYLIQ Concentrate, Wallerstein Co.) was added (0.15 g.) and the starch gelatinized at 175° C. After 1 hour hold at 175° F, the temperature was increased to 205° F and 80 g. of $H_2O$ removed by distillation over 45 minutes. The mixture was cooled to room temperature, protected with a bactericide, and poured into excess ethanol to isolate the product hydrolysate.

Approximately 25 parts by weight of the above enzyme hydrolized starch (D.E. = 0) containing ca 3% moisture was suspended in 200 parts pyridine and dissolved as recited in Example B. Approximately 37 parts by weight of butyric anhydride were added over 40 minutes at 180° F. The reaction mixture was held at 180° F for approximately 3 hours and then 11 parts by weight of phthalic anhydride were added as a solid. After an additional 3 hours hold at 180° F, the mixture was cooled and the product isolated by precipitation into cold water.

EXAMPLE H

Hydrolyzed Starch Acetate-Octenylsuccinate, D.S. = 0.2/0.5

Total D.S. = 0.7

Approximately 166 parts by weight of hydrolyzed starch of low molecular weight having a D. E. value of 10 and containing approximately 2.6% by weight of moisture was suspended in 175 parts by weight of pyridine and then dissolved by agitating at temperatures ranging up to 150° F. Approximately 45 parts by weight of acetic anhydride were added over 1 hour while maintaining the reaction temperature below 200° F. After 30 minutes hold, approximately 105 parts by weight of n-octenyl-succinic anhydride were added over 1 hour at temperatures below 200° F. The mixture was stirred an additional 1 hour at the same temperature and then cooled. The product was isolated by precipitation of the reaction mixture into cold water acidified to pH ca 2–3.

Of the various sources of starch having average molecular weights ranging up to about 100,000, a specific example is a hydrolyzed starch commercially available as cereal solids which comprises approximately 20% hydrolyzed starch chains containing less than seven anhydroglucose repeat units and about 80% hydrolyzed starch chains with seven or more anhydroglucose repeat units. The average molecular weight of this hydrolyzed starch is such that solutions of pourable viscosity may be prepared in water or some other organic solvent at a solids content of 50% or more.

In comparison to the high molecular weight low substituted starch esters, the highly substituted mixed starch esters of this invention provide many advantages, e.g. particularly with regard to solubility characteristics. For example, at any given degree of substitution, e.g. ranging from 0.5 to 3.0, the lower molecular weight mixed starch esters are soluble in a wider range of solvents. Moreover, the wide variation in the degree of substitution and the types of ester groups allows the starch esters to be prepared with controlled characteristics such that they may be designed for use in a particular blend of solvents ranging from water to organic liquids and various combinations of organic solvents and water.

Solutions of pourable viscosity at a 50 to 60% solids content or higher are possible with the starch esters of this invention whereas the higher molecular weight esters with lower degrees of substitution result in solutions of substantially higher viscosity at a lower solids content. The combination of a high solids and a low viscosity, made possible by the starch esters of this invention, is of particular value in the coating arts where it is desirable to have a high concentration of polymer per volume of solvent.

Starch esters of low D. S. value, e.g. less than 0.1 have properties which are not much different from the properties of hydrolyzed starch prior to esterification. In comparison, the highly substituted mixed esters described herein have many different properties by virtue of the variation in type of ester groups and degree of substitution. Thus, the mixed starch ester hereof may be prepared to have a particular solubility, reactivity, melting point, crystallinity, film forming properties, permeability, etc. which for the most part are altered by changing the degree of substitution and relationship and/or ratios of the various anhydrides from which the esters are prepared.

Although the mixed starch esters of this invention are particularly useful as coatings, e.g. preparing films from aqueous and/or organic mediums, powder coatings, etc. to protect various surfaces, other uses include drugs, textiles, adhesives and particularly as an additive in the paper industry, dispersing agent, e.g. for pigment dispersions in aqueous mediums and various other uses which would be obvious to one skilled in the art.

The mixed esters may be combined with water soluble or water dispersible crosslinking agents, e.g. epoxy or amino-crosslinking agents such as hexamethoxymethyl melamine, ureaformaldehyde, etc. in water and/or organic mediums, e.g. 80 to 20% by weight of water and butyl cellosolve. The aqueous coatings may contain a variety of pigments, e.g. titanium dioxide and then applied to a substitute such as steel and heat cured to produce a variable gloss, durable protective coating. The starch derivatives which functions as a binder in the coatings are substantially insoluble in neutral or acidic water but can be solubilized to opaque or clear solutions by reacting same with a base, e.g. sodium hydroxide, ammonium hydroxide, an amine such as triethanol amine, dimethylethanol amine, etc. With the addition of a crosslinking agent, the coating may be applied by conventional means, e.g. an air spray gun and heat cured to produce a high gloss, wate-resistant protective coating, with exceptional hardness and resistance to solvents.

The following examples illustrate the use of anionic carboxyl-containing mixed starch esters of this invention in coating compositions.

TABLE VII

| Aliphatic Carboxyl Esters of Hydrolyzed Starch Capable of Solubilization in Water by Addition of Base | |
|---|---|
| Ester | D. S. |
| Acetate-Succinate | 1.7/0.4 |
| Propionate-Succinate | 2.3/0.5 |
| Butyrate-Succinate | 2.3/0.5. |

EXAMPLE 1

| Composition of Cosolventless Starch Propionate-Succinate Coating | |
|---|---|
| Component | Parts by Weight |
| Hyd. Starch Propionate-Succinate (D.S. = 2.3/0.5) | 210 |
| Water | 484 |
| Dimethylethanolamine | 15 |
| Methylolated Melamine [a] | 90 |
| Titantium Dioxide | 225 |
| Butyl Cellosolve | 26 |

[a] e.g., Resimene 730 or Cymel 303.

These mixed starch esters may be used to prepare "high solids coatings" wherein at least 80% of the total weight of the coating material remains in the film and no more than about 20% by weight of the total composition is released to the environment as volatile matter. Thus, the mixed starch esters when combined with a suitable crosslinker are useful for the preparation of high solids coatings. These coatings may be either clear or pigmented as illustrated by the following examples.

EXAMPLE 2

| Components | Parts by Weight |
|---|---|
| Starch Acetate-Succinate Mixed Ester D.S. = 1.0/1.0 | 60 |
| Butyl Cellosolve | 20 |
| 1,4-Butanediol diglycidyl Ether | 20 |

A solution was prepared from the above components which formed a clear homogeneous mixture of low viscosity, easy to pour and handle. When applied as a coating and heated to curing temperature, only the Cellosolve was volatilized with the other components interacting to give a clear durable film of protective quality. If desirable, a solution of the above may be diluted with water to lower the viscosity for the particular application, such as spraying and the like. If a pigmented coating is desired, the composition may be modified to include the necessary amounts of $TiO_2$ or other pigments while still maintaining the high solids nature of the system. As examples of crosslinkers, various known compounds may be used which contain isocyanate functionality, methylolated amino functionality, alkylated amino functionality, epoxy functionality, etc. In addition, many other known crosslinking agents containing reactive functional groups may be used with the carboxyl-containing starch esters in preparing the coating compositions.

Pigmented aqueous coating compositions are illustrated by the following examples.

EXAMPLE 3

| Components | Parts by Weight |
|---|---|
| Hydrolyzed Starch Acetate-Succinate D.S. = 1.7/0.5 | 75 |
| Araldite RD-2 (1,4-butanedioldiglycidyl ether) | 25 |
| Water | 136 |
| Butyl Cellosolve | 34 |
| $TiO_2$ | 70 |

The above coating composition was applied to a metal substrate by conventional techniques and cured in about 15 minutes at 325° F.

EXAMPLE 4

| Components | Parts by Weight |
|---|---|
| Hydrolyzed Starch Propionate-Succinate Ester | 21.0 |
| Cymel 303 (crosslinking Agent) | 9.0 |
| Dimethylethanol amine | 1.5 |
| $TiO_2$ | 22.6 |
| Water | 42.9 |
| Butyl Cellosolve | 3.0 |

In Example 4, the total vehicle composition was 70% of the starch ester and 30% of the melamine crosslinking agent. The total solvent composition was 93.5 % water and 6.5% butyl Cellosolve. The coating was applied by conventional spray techniques and cured in 15 minutes at 325° F.

The coating compositions comprising the mixed starch esters of this invention may contain effective amounts, e.g. ranging up to about 60% and preferably up to about 30% by weight of the coating of at least one pigment particularly an inorganic pigment such as titanium dioxide, zinc oxide and various organic pigments such as phthalocyanine blue, green, the chromates such as lead chromate, molybdate orange, zinc sulfide, the alkaline earth sulfates such as barium sulfate, clay, mica, the carbonates such as calcium carbonate, silica, cadmium yellow, chromium oxides, carbon black, antimony oxide, chromium green, and various combinations of inorganic and organic pigments.

In addition, various pigment dispersants such as the polyesthers, sulfolignins, pyrophosphates, gum arabic, silicates, sulfonates and various other water soluble dispersants may be used in the coatings to improve the dispersion of the pigments. Other components that may be added include the protective colloids or thickeners such as carboxymethyl cellulose, the polyacrylates, the aliginates, methyl cellulose, hydroxyethyl cellulose and various freezing inhibitors such as ethylene glycol, propylene glycol, etc. In addition, bacteriocides and fungicides, e.g. the halogenated acetylene alcohols, the phenols and the salts of phenols including the halogenated phenols such as trichlorophenol may be added to the coating compositions to inhibit degradation.

While this invention has been described by a number of specific embodiments, it is obvious there are variations and modifications which can be made without departing from the spirit and scope of the invention as set forth in the appended claims.

The invention claimed is:

1. A coating composition comprising an effective amount of a mixed ester of starch with up to about 50% by weight of said starch ester of an organic crosslinking agent and from about 0 to 60% by weight of said starch ester of pigment;
    said mixed ester of starch characterized as having an average molecular weight ranging up to about 100,000 and an average degree of substitution ranging from 0.5 to 3.0 wherein at least about 0.1 of the total degree of substitution consist of ester groups having pendant carboxyl groups; said ester of starch derived from
        (a) low molecular weight hydrolyzed starch and the derivatives thereof having a plurality of anhydroglucose units and
        (b) at least about 0.5 mole of acylating agent for each anhydroglucose unit of the hydrolyzed starch and the derivatives thereof;
    said acylating agent consisting of (i) from about 0.1 to 2.9 moles of at least one anhydride of a polycarboxylic acid and (ii) from 0.1 to 2.9 moles of at least one agent selected from the class consisting of anhydrides of monocarboxylic acids and acyl halides of monocarboxylic acids.

2. The coating composition of claim 1, further characterized in that the coating composition contains water, the crosslinking agent is an amino compound and the pigment is titanium dioxide.

3. The coating composition of claim 2 further characterized in that the amino compound is an alkoxy methyl melamine.

4. The coating composition of claim 1 further characterized in that the low molecular weight hydrolyzed starch derivative has a D. S. value less than 0.1.

5. The coating composition of claim 1 further characterized in that the pendant carboxyl groups are reacted with an inorganic metal compound.

* * * * *